United States Patent [19]

Allen

[11] Patent Number: 4,858,559

[45] Date of Patent: Aug. 22, 1989

[54] DISPOSABLE PET TOILET UNIT

[76] Inventor: Pamela J. Allen, 1449 Roods Lake Rd., Lapeer, Mich. 48446

[21] Appl. No.: 108,245

[22] Filed: Oct. 13, 1987

[51] Int. Cl.⁴ ............................................. A01K 67/00
[52] U.S. Cl. ...................................................... 119/1
[58] Field of Search ........................ 119/1; 383/72, 75; 220/462

[56] References Cited

U.S. PATENT DOCUMENTS

| | | | |
|---|---|---|---|
| 515,928 | 3/1894 | Thompson | 383/72 X |
| 2,212,390 | 8/1940 | Conklin | 383/75 X |
| 3,193,065 | 7/1965 | Politzer | 383/72 X |
| 3,227,137 | 1/1966 | Goldman et al. | 119/1 |
| 3,399,818 | 9/1968 | Stegner | 220/462 |
| 3,626,900 | 12/1971 | Failla | 119/1 |
| 3,990,396 | 11/1976 | Turk | 119/1 |
| 4,308,825 | 1/1982 | Steparian | 119/1 |
| 4,312,295 | 1/1982 | Harrington | 119/1 |
| 4,763,603 | 8/1988 | Coes | 119/1 |

Primary Examiner—Gene Mancene
Assistant Examiner—R. Thomas Price
Attorney, Agent, or Firm—Ralph T. Rader

[57] ABSTRACT

A disposable pet toilet unit is disclosed having a body portion within which a deodorizing, absorbent, granular material is contained for use by household pets to defecate and urinate. The body portion is made of a moisture-proof material and includes a bottom and a plurality of sides extending upwardly from the bottom to form an opening. A moisture-proof film is secured to the body portion and gatherable about the opening thereof by a closure, such as a drawstring. Thus, when the deodorizing, absorbent, granular material becomes sufficiently soiled so as to no longer adequately deodorize and absorb odor and moisture, the drawstring may be pulled to gather the film together about the opening to substantially seal it. In this manner, the disposable pet toilet unit may be transported and discarded without spillage or leakage of the soiled, deodorizing, absorbent, granular material.

3 Claims, 1 Drawing Sheet

DISPOSABLE PET TOILET UNIT

The present invention relates generally to toilet units, and more specifically to a disposable toilet unit for use by pets, one aspect of which is that upon becoming sufficiently soiled by liquid and solid waste, the toilet unit can be easily discarded.

BACKGROUND OF THE INVENTION

Pet owners often keep their pets in their homes away from their free, wandering, natural out-of-door environment. However, a particularly troublesome problem arises in maintaining pets in densely populated areas. Apartment buildings, for example, do not afford satisfactory locations for handling normal animal liquid and solid waste. This creates several problems, particularly where excrement is deposited in gutters at the side of streets or on the pavement.

Because of sanitary considerations, as well as other considerations, government agencies have passed ordinances to place certain restrictions on pet owners regarding the control of and responsibility for their pets. Thus, pet owners in, for example, large metropolitan areas such as New York City are required to clean up after their pets or face possible fine. Devices to assist and render such a job less repulsive have included a portable dust pan and broom. Also, portable toilets or commodes have been developed for one-time use by the pets, particularly dogs, such as those disclosed in U.S. Pat. Nos. 4,156,400 (Migdal) and 3,626,900 (Failla).

This problem of waste containment and removal is compounded where pets must remain unattended indoors for long periods of time because of the owner's work or other demands to be away from the home. Various attempts have been made heretofore to provide receptacles for the excrement of household pets. Such devices have included litter boxes containing a deodorizing, absorbent granular material commonly referred to as "litter," which because of its intended purposes requires changing from time to time. It is because of this need for periodic changing that most problems occur. In addition, this chore is usually distasteful and unpleasant for the pet owner and usually results in spillage of the litter.

Thus, animal litter boxes have been lined with a disposable plastic liner before they are filled with litter. The purpose of the liner is to keep the inner surface of the box clean and to facilitate removal of the litter from the box to a waste receptacle after it has become soiled, examples of which are disclosed in U.S. Pat. Nos. 3,227,137 (Goldman et al.) and 3,684,155 (Smith).

However, several problems are associated with such liners, the principal of which is that the configuration of the liner does not typically fit precisely the contour of the interior of the litter box. Therefore, it tends to bunch up or gather in loose folds under the litter to be caught and is torn by the claws of the pet using the box. A cat, for example, will frequently tear a bag liner when it digs a depression in the litter, preparatory to using the litter box. In addition, tears can occur when the cat thrusts its hind legs in order to cover the waste. Spillage of soiled litter through the tear holes results when the liner is later lifted out of the box for disposal.

Therefore, liners for litter boxes were developed which provided a flat, disposable plastic film liner having a pocket therein into which the soiled litter may be received for easy removal, as disclosed in U.S. Pat. No. 4,279,217 (Behringer). However, like prior liners, a good deal of loose liner material overhangs around the sides of the box presenting an unaesthetic appearance. Further, such liners are still susceptible to tears in at least the top layer of the film which, upon removal of the liner, results in soiled litter leaking into the inside of the litter box from where it has to be removed.

Other waste-removing devices have been developed as disclosed in U.S. Pat. No. 4,308,825 (Stepanian). Such devices include a screen placed onto an absorbent, porous material, such as newspaper, whereby liquid pet waste would pass through the screen into the material. In addition, litter could be placed onto the screen. Thus, the solid waste of the pet would remain on the litter until it was removed by lifting the screen through the litter filtering the waste therefrom. However, litter usually would be spilled when removing the screen, and like the prior litter boxes, soiled litter eventually would have to be disposed of, which because of the absence of a liner, was even more difficult.

Thus, there has been a need for a disposable pet toilet unit, which would eliminate the problems and limitations associated with the prior devices discussed above, the most significant of the problems being the requirement for replacement of litter upon becoming sufficiently soiled.

SUMMARY OF THE INVENTION

In contrast to the devices, including litter boxes, discussed above, the disposable pet toilet unit of the present invention is suitable and adaptable for modern living in densely populated areas to relieve pet owners of some of the unpleasantries associated with replacing and discarding soiled litter.

The disposable pet toilet unit of the present invention includes a body portion and a deodorizing, absorbent, granular material contained therein, such as litter. The body portion is made of a moisture-proof material and has a bottom and a plurality of sides extending upwardly therefrom to form an opening to a central chamber. The body portion has an outer edge around the perimeter of the opening. A moisture-proof film is secured to the body portion and gatherable about the opening. A closure means, such as a drawstring in the preferred embodiment, is associated with the moisture-proof film for gathering it about the opening to substantially seal the body portion. Thus, when the litter becomes soiled, the drawstring can be pulled to seal the disposable pet toilet unit, which permits disposal without spillage or leakage of the soiled litter.

In the preferred embodiment, an outer end of the moisture-proof film is folded and fastened to itself to form a facing having a pathway therethrough into which the drawstring is contained. Thus, when the drawstring is pulled, the outer end of the moisture-proof film is drawn together to close the opening. In addition, the moisture-proof film may be permanently attached about the outer edge of the opening and folded thereabove for ease of gathering. In the disclosed embodiment, the moisture-proof film may include an integral bottom portion to form a bag-like member permanently attached to the body portion. In addition, the folded-up film may be held in position about the body portion by an attachment means. In the preferred embodiment, the attachment means is adapted to include a plurality of straps having two ends. At least one of the ends is releasably attached to the body portion. Further, the bottom of the moisture-proof film may be attached to the bottom of the body portion. Alternatively, the moisture-proof film may be folded up upon itself along the sides of the body portion beneath the level of litter between the litter and the sides of the body portion.

In addition, the present invention contemplates a method for discarding litter, contained within a pet toilet unit, after it has become soiled by defecation and urination from household pets. The method includes pulling on a drawstring contained within a passageway of a moisture-proof film attached to a body portion containing the soiled litter. The film is gathered about the opening to the body portion to seal the soiled litter within the body portion. The pet toilet unit is then lifted up by the area where the drawstring has been gathered together about the opening and discarded without spillage or leakage of the soiled litter. In addition, when the film is gathered about the opening, it unfolds as the drawstring is pulled. Initially, the pet toilet unit is placed in a position for use by the household pet.

DESCRIPTION OF THE DRAWINGS

The various features, objects, benefits, and advantages of the present invention will become more apparent upon reading the following detailed description of the preferred embodiment along with the appended claims in conjunction with the drawing, wherein like reference numerals identify corresponding components, and:

DETAILED DESCRIPTION OF THE PREFERRED EMBODIMENT

Figure 1:
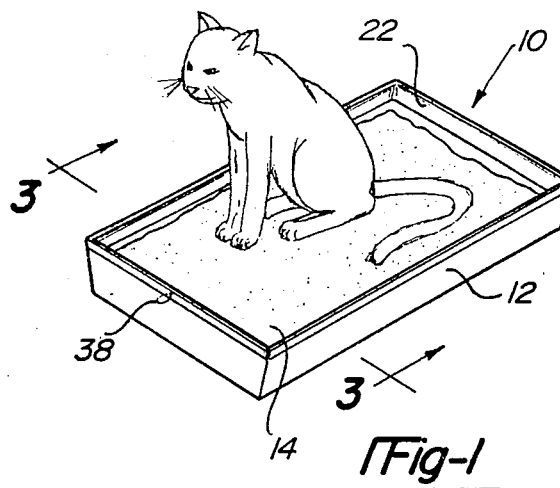
FIG. 1 is a perspective view of the disposable pet toilet unit of the present invention in a usable mode.

Referring to FIG. 1 of the drawing, a disposable pet toilet unit, generally designated at 10, is illustrated. The disposable pet toilet unit 10 includes a body portion 12 containing a deodorizing, absorbent material 14, such as for example granular clay and commonly referred to as litter. The particular material 14 is not essential to the present invention as long as it absorbs moisture and odor from pet excretions, such as solid and liquid waste. Such materials are commonly available from a number of sources through neighborhood grocery stores and pet stores.

Figure 2:
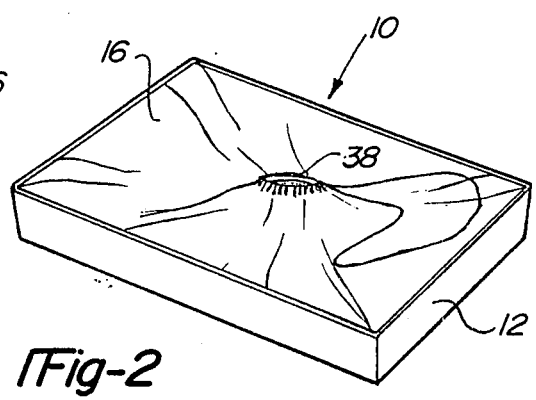
FIG. 2 is a perspective view of the disposable pet toilet unit of the present invention in a discardable mode.
Figure 3:
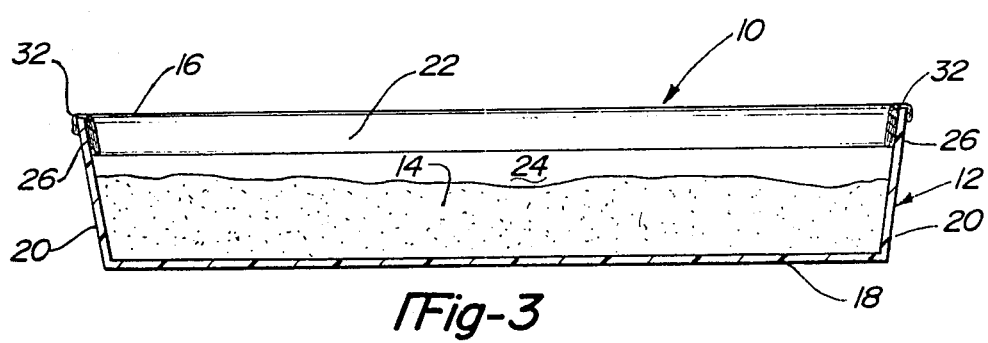
FIG. 3 is an enlarged cross-sectional view of the disposable pet toilet unit, taken in the direction of arrows 3—3, of FIG. 1.

A moisture-proof film 16 is secured to the body portion 12, which may be gathered about the body portion, as illustrated in FIG. 2, when the material 14 becomes sufficiently soiled to the point where it no longer adequately deodorizes and absorb odors and moisture. The body portion 12, as illustrated in greater detail in FIG. 3, is of generally rectangular configuration having a bottom 18 and a plurality of sides 20 extending upwardly therefrom to form an opening 22 to an interior central chamber 24. The particular shape of the body portion 12 is not essential to the present invention and may include circular, square or any other polysided configuration having a central chamber in which litter may be contained. The shape is basically a matter of choice for aesthetic or other purposes, such as space and size of pet.

The film 16 is attached along an outer edge 26 of the body portion 12. The film 16 is preferably made from a moisture-proof material, such as polyethylene or polypropylene. Moisture-proof polymeric materials are preferred because of the odor and moisture resulting from the liquid and solid waste deposited from time to time within the litter 14. In addition, such polymeric materials are readily available, economical and lend themselves to being gathered about the opening 22 for sealing the disposable pet toilet unit 10 of the present invention.

Figure 5:
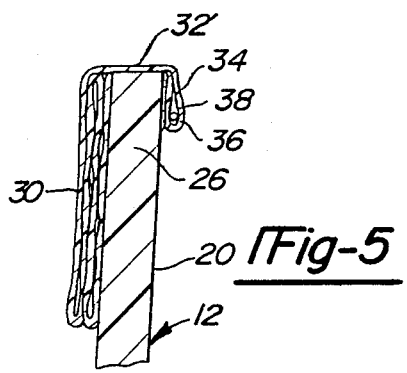
FIG. 5 is an enlarged fragmentary view of the disposable pet toilet unit, in section, showing the details of the folding of the film about the outer edge of the body portion.
Figure 4:
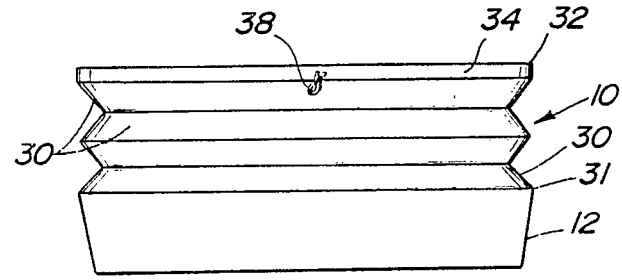
FIG. 4 is a front schematic view of the disposable pet toilet unit with the film extended upwardly.

As illustrated in FIG. 4, the film 16 includes a plurality of sides 30 forming a tubular member. As described above, the film is attached at one end 31 to the body portion 12. The other or outer end 32 is folded over and fastened to itself to form a facing 34 having a pathway 36 therealong, see FIG. 5. In this manner, a closure means, such as a drawstring 38 in the preferred embodiment, may be threaded along the pathway 34 by which the film may be gathered about the opening to seal it. Thus, when the drawstring is pulled, the film 16 comes together to close the opening. To facilitate gathering of the film 16, it is folded about the body portion. Also, in this manner, it is more compact and out of the way in a more aesthetically pleasing fashion.

Figure 6:
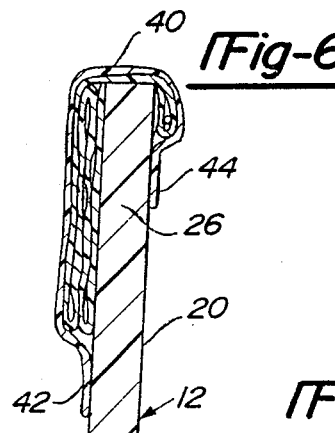
FIG. 6 is an enlarged fragmentary view of the disposable pet toilet unit, in section, with the film fastened about the outer edge of the opening of the body portion by a strip.

The film 16 may be fastened to the body portion 12 by any suitable means, including adhesives, fasteners such as staples and strips, etc., or integrally formed with the body portion 12. The particular fastening means is not essential to the present invention. However, it is preferred that the film be securely fastened to the body portion 12. Thus, after the film has been gathered about the opening 22, the disposable pet toilet unit 10 can be lifted by the film to be discarded. To ensure that the pet does not knock the film loose from the sides of the body portion 12, a plurality of straps 40 may be placed along the outer edge 26 of the body portion 12, as illustrated in FIG. 6. One end 42 of the strap 40 may be attached to the inside of the chamber and the other end 44 may be attached along the outside by, for example, a pressure-sensitive adhesive. In this manner, when the drawstring is pulled, the straps are released at the outer ends 44, permitting the film to be gathered about the opening.

Figure 7:
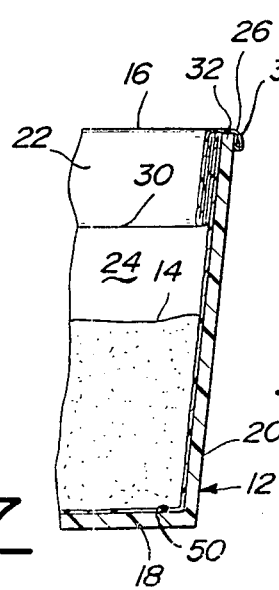
FIG. 7 is an enlarged fragmentary view, in section, of an alternative disposable pet toilet unit.
Figure 8:
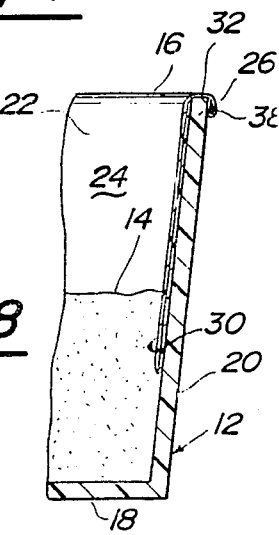
FIG. 8 is an enlarged fragmentary view, in section, of an alternative disposable pet toilet unit.

In alternative embodiments, the film may have a bottom portion 50 to form a bag-like member. In this manner, at least the bottom portion 50 may be securely fastened to the bottom 18 of the body portion 12, as illustrated in FIG. 7. As an alternative to folding the sides 30 of the film 16 about the outer edge 26 of the body portion 12, they may be folded below the level line of the litter 14 with the facing fastened to the outer part of the sides 20, as illustrated in FIG. 8. In this manner, a pet is less likely to knock loose the film 16 from the sides 20 of the body portion 12. Thus, when the drawstring 38 is pulled, the outer end 32 of the film is released from the sides 20 of the body portion 12. As the film is gathered together about the opening, the sides 30 unfold and slip from between the litter 14 and the sides 220 of the body portion 12. It should also be appreciated that a portion of the sides 30 of the film 16 may be secured or fastened to the sides 20 of the body portion 12. This will provide additional security when pulling on the film 16 to prevent separation from the body portion.

The particular material of which the body portion 12 is made is not essential to the present invention. The body portion may be made from a variety of suitable materials and manufactured by several manufacturing processes well known to those skilled in the art. In the preferred embodiment, the body portion 12 may be injected-molded from a polymeric material such as styrene. Polymeric materials are preferred because of their moisture-proof characteristics and ease of forming. In addition, such a material may be molded to include aesthetically pleasing features such as designs, embossings and the like. Further, to provide structural strength to the body portion 12, ribs may be molded therein. Normally, the manufacturers of this product will select the best commercially available material, based upon price, application and manufacturing process.

OPERATION AND USE

The operation and use of the disposable pet toilet unit 10, illustrated in FIGS. 1 and 2, will now be explained. The disposable pet toilet unit 10, initially, may be packaged in any suitable means, such as cardboard or the like, whereupon it may be removed and placed in a position for use. With time, the household pet will use the disposable pet toilet unit 10 for its intended purpose, namely the exercise of its excretory functions, whereby liquid and solid waste will be deposited on or within the litter. After repeated use, the litter 14 will reach a point where it has become sufficiently soiled so as to be unsightly and exuding unpleasant odors. At such a point, the unit 10 may be easily and neatly disposed of by pulling on the drawstring to gather the film 16 about the opening 22. Thus, with the soiled litter sealed within the unit 10, it may be lifted by the film, preferably where it is closely gathered by the drawstring. Thereafter, a new, unsoiled disposable pet toilet unit 10 may then be installed for use. All of this may be easily accomplished without fuss or mess.

While the preferred embodiment of the present invention has been described so as to enable one skilled in the art to practice the device of the present invention, the preceding description is intended to be exemplary and should not be used to limit the scope of the invention. The scope of the invention should be determined only by reference to the following claims.

What is claimed is:

1. A disposable pet toilet unit for use by household pets to defecate and urinate in, whereby odors may be absorbed, comprising:

a body portion of a moisture-proof material having a bottom and a plurality of sides extending upwardly therefrom to form an opening to a central chamber defined by the sides and the bottom, each side having an inner face and an outer face, said inner face of each side facing inward towards said opening, said body portion having an outer edge around the perimeter of the opening on the outer faces of said sides;

a deodorizing, absorbent, granular material contained within the chamber of the body portion and extending upwardly along the inner faces of said sides to a predetermined level of absorbing moisture and odors from defecation and urination;

a moisture-proof film permanently attached to said body portion and gatherable about the opening thereof;

said film being permanently attached to said body portion about said outer edge of said opening and folded over the top of said sides and onto the inner faces of said sides for ease of gathering, said film being folded onto itself on the inner faces of said sides at a location substantially above said predetermined level of granular material such that said folded film only extends a relatively small distance into said opening;

closure means associated with said moisture-proof film for gathering said film together about said opening by unfolding said film to substantially seal said body portion when said deodorizing, absorbent, granular material becomes sufficiently soiled so as to no longer adequately deodorize and absorb odor and moisture, and said film remaining attached to said body portion before, during and after said gathering;

wherein said closure means is adapted to include a drawstring, and an outer end of said film is folded and fastened to itself to form a facing having a pathway therethrough into which said drawstring is contained, whereby when the drawstring is pulled, the outer end of said film is drawn together, unfolding said film from said body portion to close the opening;

whereby said body portion and film are transported and discarded as a one-piece disposable unit without spillage or leakage of the soiled deodorizing, absorbing, granular material.

2. The disposable pet toilet unit defined in claim 1, wherein said film is initially held in a folded position by an attachment means.

3. The disposable pet toilet unit defined in claim 2, wherein said attachment means is adapted to include a plurality of straps having two ends, at least one of said ends being releasably attached to said body portion.

* * * * *